(12) United States Patent
Kwon (10) Patent No.: US 10,266,067 B2
(45) Date of Patent: Apr. 23, 2019

(54) METHOD AND SYSTEM FOR CONTROLLING VOLTAGE OF FUEL CELL IN STOP-MODE OF FUEL CELL VEHICLE

(71) Applicants: Hyundai Motor Company, Seoul (KR); Kia Motors Corporation, Seoul (KR)

(72) Inventor: Sang Uk Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 430 days.

(21) Appl. No.: 15/163,377

(22) Filed: May 24, 2016

(65) Prior Publication Data

US 2017/0166081 A1 Jun. 15, 2017

(30) Foreign Application Priority Data

Dec. 10, 2015 (KR) .................. 10-2015-0176376

(51) Int. Cl.
| | | |
|---|---|---|
| G06F 19/00 | (2018.01) | |
| G06G 7/70 | (2006.01) | |
| B60L 11/18 | (2006.01) | |
| H01M 8/04303 | (2016.01) | |
| H01M 8/04828 | (2016.01) | |
| H01M 8/04992 | (2016.01) | |
| H01M 10/44 | (2006.01) | |

(Continued)

(52) U.S. Cl.
CPC ......... B60L 11/1887 (2013.01); B60L 11/189 (2013.01); B60L 11/1809 (2013.01); H01M 8/04303 (2016.02); H01M 8/04559 (2013.01); H01M 8/04567 (2013.01); H01M 8/04947 (2013.01); H01M 8/04992 (2013.01); H01M 10/44 (2013.01); H01M 16/006 (2013.01); B60L 2240/545 (2013.01); B60L 2240/549 (2013.01);

(Continued)

(58) Field of Classification Search
CPC ..................... B60L 11/1887; B60L 11/1809; B60L 11/189; H01M 8/04303; H01M 8/04559; H01M 8/04567; H01M 5/04947; H01M 5/04992; H01M 10/44; H01M 16/006
USPC .................... 701/99; 429/444, 432
See application file for complete search history.

(56) References Cited

U.S. PATENT DOCUMENTS

| | | | |
|---|---|---|---|
| 9,640,812 B2 | 5/2017 | Kumada et al. | |
| 2014/0087285 A1* | 3/2014 | Kumada | H01M 8/04223 429/444 |
| 2014/0295307 A1* | 10/2014 | Toida | B60L 1/003 429/432 |

FOREIGN PATENT DOCUMENTS

| | | |
|---|---|---|
| CN | 101624020 A | 1/2010 |
| CN | 102800884 A | 11/2012 |

(Continued)

*Primary Examiner* — Mahmoud S Ismail
(74) *Attorney, Agent, or Firm* — Mintz Levin Cohn Ferris Glovsky and Popeo, P.C.; Peter F. Corless (57) ABSTRACT

A method and system for controlling a voltage in a stop-mode of a fuel cell vehicle are provided. The method includes detecting whether a fuel cell enters the stop-mode and calculating a voltage command value of a bus terminal based on available charging power of a battery representing a level of power chargeable in a high voltage battery when the fuel cell enters the stop-mode. A converter connected between the high voltage battery and the bus terminal is operated to adjust the voltage of the bus terminal to be the voltage command value of the bus terminal. Additionally, power consumption of an electric field load of a vehicle is increased when the voltage is adjusted and then the voltage of the fuel cell measured by a voltage sensor is equal to or greater than a reference voltage preset in a memory.

16 Claims, 4 Drawing Sheets

(51) Int. Cl.
  *H01M 16/00* (2006.01)
  *H01M 8/04537* (2016.01)
  *H01M 8/04* (2016.01)
(52) U.S. Cl.
  CPC .... *H01M 2220/20* (2013.01); *H01M 2250/20* (2013.01); *Y02T 10/7072* (2013.01); *Y02T 90/14* (2013.01); *Y02T 90/32* (2013.01); *Y02T 90/34* (2013.01)

(56) References Cited

FOREIGN PATENT DOCUMENTS

| | | |
|---|---|---|
| JP | 2002-352839 A | 12/2002 |
| JP | 2006-252881 A | 9/2006 |
| JP | 2006-309971 A | 11/2006 |
| JP | 2007-305412 A | 11/2007 |
| JP | 2009-022153 A | 1/2009 |
| JP | 2010-239743 A | 10/2010 |
| JP | 2012-134166 A | 7/2012 |
| JP | 2012-227008 A | 11/2012 |
| JP | 2012-243738 A | 12/2012 |
| JP | 2012-244721 A | 12/2012 |
| JP | 2014-110118 A | 6/2014 |
| JP | 5521481 B2 | 6/2014 |
| JP | 2015-015193 A | 1/2015 |
| JP | 5804205 B2 | 11/2015 |
| KR | 10-2009-0130454 A | 12/2009 |
| KR | 2010-0005768 A | 1/2010 |
| KR | 2014-0145938 A | 12/2014 |

* cited by examiner

METHOD AND SYSTEM FOR CONTROLLING VOLTAGE OF FUEL CELL IN STOP-MODE OF FUEL CELL VEHICLE

CROSS REFERENCE TO RELATED APPLICATION

The present application claims priority to Korean Patent Application No. 10-2015-0176376, filed on Dec. 10, 2015, the entire contents of which is incorporated herein for all purposes by this reference.

BACKGROUND

1. Technical Field

The present invention relates to a method and system for controlling a voltage of a fuel cell in a stop-mode of a fuel cell vehicle capable of securing durability of the fuel cell and preventing fuel efficiency from reducing by actively decreasing a voltage when the fuel cell of the fuel cell vehicle stops.

2. Description of the Related Art

In a fuel cell vehicle, when a stop entry condition of a fuel cell is satisfied, a stop-mode process is performed. The stop-mode process suffers from a power generation stopping process that stops an air blower to confirm whether an air flow rate is reduced. When the air flow rate is reduced, the power generation stopping process is completed and the fuel cell vehicle enters the stop mode.

Even after the fuel cell enters the stop mode, a voltage of a fuel cell stack does not immediately decrease. When ram air is introduced or no hydrogen cross over is present, the voltage is continuously maintained near an open-circuit voltage (OCV), which leads to a deterioration in durability of the stack. Further, there is a need to forcibly decrease the stack voltage, but when the stack voltage is maintained to be too low, a reacceleration deteriorates due to time required for voltage increase when the fuel cell restarts. Therefore, there is a need to control the voltage decrease within a range where the reacceleration of the vehicle does not deteriorate to prevent the stack voltage from being maintained near the OCV.

Meanwhile, a resistor may be connected to decrease the voltage, which leads to the reduction in fuel efficiency. Therefore, a method for generating an output of the fuel cell by a control of a voltage decrease of a bus terminal using a power converter to decrease a voltage of the fuel cell (e.g., when a supply of air stops), consuming the output of the fuel cell by a driving motor or high voltage auxiliaries, and forcibly charging extra power with a high voltage battery is used.

The output of the fuel cell may be generated by the control of the voltage decrease of the bus terminal using a power converter of a high voltage battery of the vehicle and since an available output for charging a battery is limited, when a regenerative braking amount is substantial, regenerative braking energy is reduced, which may cause a loss of fuel efficiency. Further, when the generation of the output of the regenerative braking and the output of the fuel cell is not reduced, the battery may be overcharged.

Therefore, the related art controls the voltage decrease of the bus terminal using the power converter only when there is no vehicle speed or the current regenerative braking amount is not greater than the limited value of the regenerative braking, by preventing the battery from being overcharged and considering the fuel efficiency. Further, a process of determining whether the high voltage battery is in a chargeable state may be added. In other words, the voltage decreasing control of the bus terminal to generate the output of the fuel cell and decrease the voltage of the fuel cell is performed by understanding in advance the situation that the loss of the fuel efficiency and the overcharging of the battery may be prevented.

However, when the output of the fuel cell is unable to be generated by the control of the voltage decrease of the bus terminal by determining in advance based on the vehicle speed, a margin of the regenerative braking, and whether the battery is in a chargeable state, etc., the control of the voltage decrease of the bus terminal may not be performed even when a minimal amount of output of the fuel cell may be generated. However, insufficient the margin of the regenerative braking is, the minimal of output of the fuel cell as much as the insufficient margin may be generated and thus, the voltage of the fuel cell may decrease even at a slow speed. Therefore, according to the related art, the voltage of the fuel cell decreases at a slow speed or does not sufficiently decrease, and thus the durability of the fuel cell may not be sufficiently secured.

The contents described as the related art have been provided only for assisting in the understanding for the background of the present invention and should not be considered as corresponding to the related art known to those skilled in the art.

SUMMARY

An object of the present invention is to provide a method and system for controlling a voltage of a fuel cell in a stop-mode of a fuel cell vehicle capable of securing durability of the fuel cell and preventing fuel efficiency from reducing by actively decreasing a voltage when the fuel cell of the fuel cell vehicle stops.

According to an exemplary embodiment of the present invention, a method for controlling a voltage in a stop-mode of a fuel cell vehicle may include: detecting, by a controller, whether a fuel cell enters a stop-mode; calculating, by the controller, a voltage command value of a bus terminal based on available charging power of a battery representing a level of power chargeable in a high voltage battery when the fuel cell enters the stop-mode; operating, by the controller, a converter connected between the high voltage battery and the bus terminal to adjust the voltage of the bus terminal to be the voltage command value of the bus terminal; and increasing, by the controller, power consumption of an electric field load of a vehicle when the voltage is adjusted and then the voltage of the fuel cell measured by a voltage sensor may be equal to or greater than a reference voltage preset in a memory.

In the detecting process, when a state of charge (SOC) of the battery is equal to or greater than a first reference or a required torque of the vehicle is equal to or less than a second reference, the controller may be configured to operate the fuel cell to enter the stop-mode. The available charging power of the battery may be derived using a data map stored in the memory of the controller. The data map may use whether the high voltage battery breaks down (e.g., fails or malfunctions), temperature of the high voltage battery, and the SOC of the high voltage battery as an input value and use the available charging power of the battery as an output value.

In the calculation process, a difference between the available charging power of the high voltage battery and actual charging power may be reflected in the voltage of the bus terminal to calculate the voltage command value of the bus terminal. In addition, the voltage command value of the bus terminal may be calculated based on the following Equation.

Voltage command value of bus terminal=voltage of bus terminal−$K1$×(Available charging power of battery−charging voltage of battery×charging current of battery)  Equation 1:

In the voltage adjustment, the controller may be configured to calculate a target charging current of the high voltage battery based on the voltage command value of the bus terminal and operate the converter based on the target charging current to charge the high voltage battery to adjust the voltage of the bus terminal to be the voltage command value of the bus terminal. In the increase of the power consumption, the converter may be operating by changing the voltage command value of the bus terminal to the reference voltage preset in the memory while increasing the power consumption of the electric field load of the vehicle.

In the calculation process, the controller may be configured to calculate the voltage command value of the bus terminal gradually descending based on a slope preset in the memory; and in the voltage adjustment, the controller may be configured to calculate the targeted charging current of the high voltage battery based on the voltage command value of the bus terminal, operate the converter based on the target charging current, and limit the target charging current to a maximum value of a battery charging limit current based on the available charging power of the battery. The battery charging limit current may be calculated by dividing the available charging power of the battery by the charging voltage of the battery. In the increase of the power consumption, the power consumption of the electric field load of the vehicle may be increased based on a driving increase and a low efficiency operation of high voltage auxiliaries including an air blower, a hydrogen recirculation blower, or a cooling water pump.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
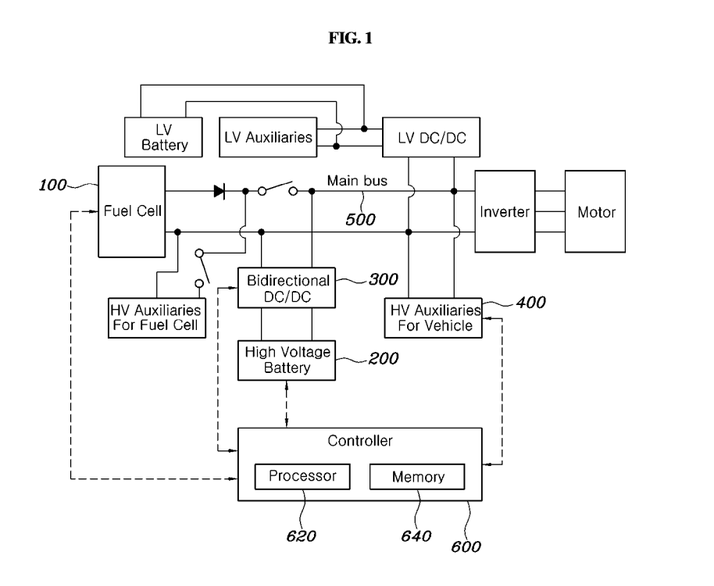
FIG. 1 is a diagram illustrating a system of a fuel cell vehicle for performing a method for controlling a voltage of a fuel cell in a stop-mode of a fuel cell vehicle according to an exemplary embodiment of the present invention.
Figure 2:
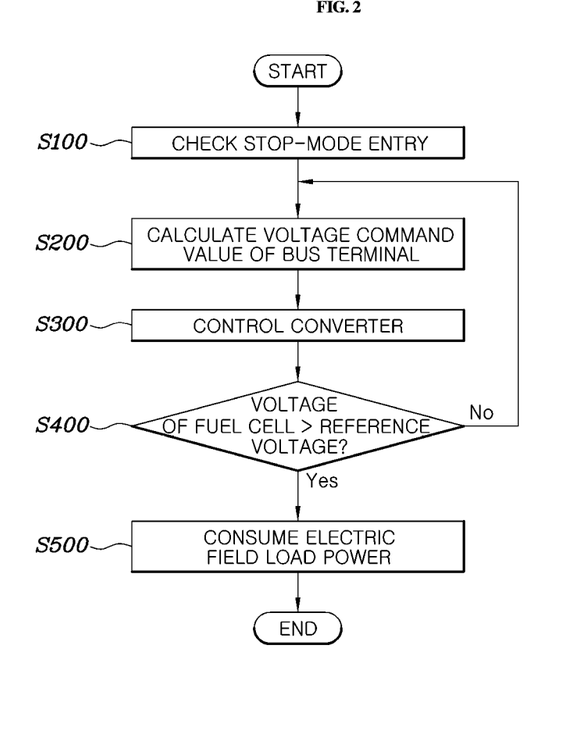
FIG. 2 is a flow chart of the method for controlling a voltage of a fuel cell in a stop-mode of a fuel cell vehicle according to the exemplary embodiment of the present invention.
Figure 3:
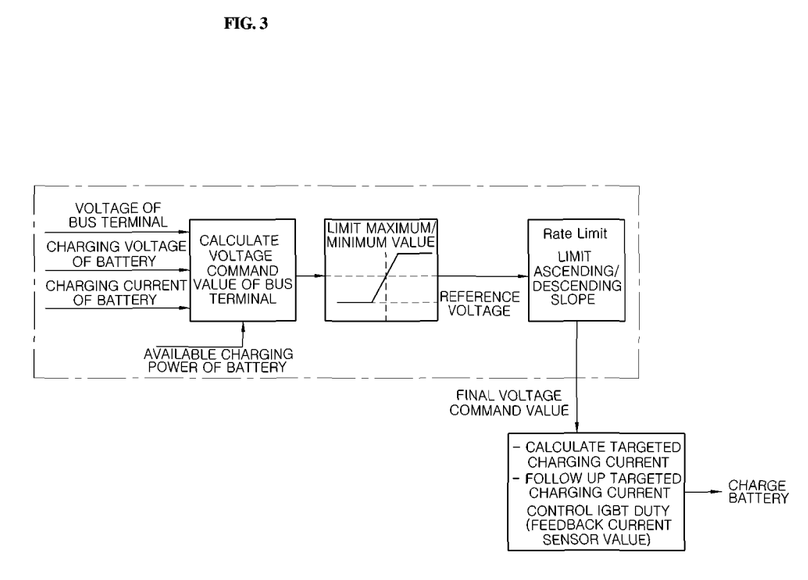
FIGS. 3 and 4 are block diagrams of the method for controlling a voltage of a fuel cell in a stop-mode of a fuel cell vehicle according to the exemplary embodiment of the present invention.
Figure 4:
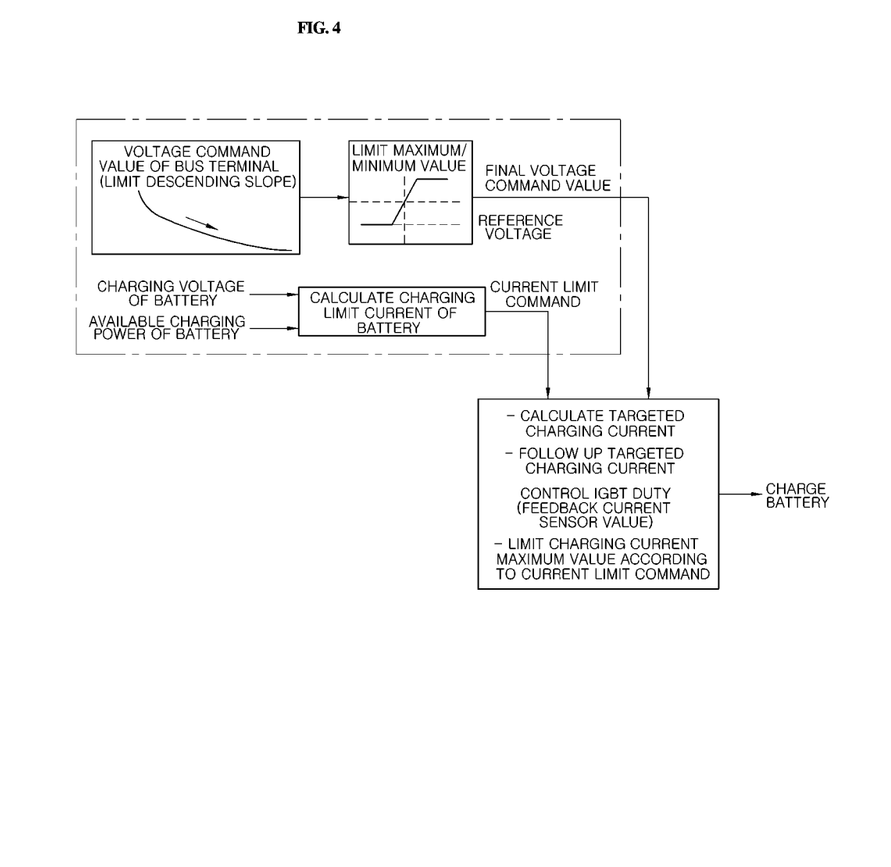

FIG. 1 is a diagram illustrating a system of a fuel cell vehicle for performing a method for controlling a voltage of a fuel cell in a stop-mode of a fuel cell vehicle according to an exemplary embodiment of the present invention, FIG. 2 is a flow chart of the method for controlling a voltage of a fuel cell in a stop-mode of a fuel cell vehicle according to the exemplary embodiment of the present invention, and FIGS. 3 and 4 are block diagrams of the method for controlling a voltage of a fuel cell in a stop-mode of a fuel cell vehicle according to the exemplary embodiment of the present invention.

The present invention proposes a control to stop a power generation of a fuel cell while driving and decrease a voltage of the fuel cell based on a voltage control of a bus terminal using a power converter after the power generation stops. Unlike the related art, a method for correcting a voltage or a method for limiting a current of the power converter by considering available charging power of a battery and actual charging power in performing the voltage control of the bus terminal is used to effectively prevent the loss of fuel efficiency and the overcharging of the battery and expand a voltage decreasing control entry of the fuel cell. Further, when the methods are unable to control the voltage decreasing of the fuel cell, a method for temporarily increasing consumption of high voltage auxiliaries is used to perform a control to expand high voltage avoidance of the fuel cell. Accordingly, durability of the fuel cell may be improved.

FIG. 1 is a diagram illustrating a system of a fuel cell vehicle for performing a method for controlling a voltage of a fuel cell in a stop-mode of a fuel cell vehicle according to an exemplary embodiment of the present invention and illustrates a hybrid system of a fuel cell 100 and a high voltage battery 200. The high voltage battery 200 may include a converter 300 that is a bi-directional power converter configured to adjust an output of the high voltage battery. There are electric field loads (e.g., high voltage electronic load, low voltage battery, low voltage electronic load, low voltage power converter converting high voltage into low voltage) other than a motor/inverter. Additionally, the fuel cell may include a diode to prevent a reverse current from flowing in the fuel cell and a relay to connect the fuel cell 100 to a main bus terminal 500. The relay may be continuously connected while a vehicle is driven and during a start/stop that is the present technology and may be disconnected during a vehicle key off or emergency shut down. Further, a controller 600 may be configured to operate the apparatuses and the controller further includes a processor 620 and a memory 640 configured to store or collect various types of information in advance.

FIG. 2 is a flow chart of the method for controlling a voltage of a fuel cell in a stop-mode of a fuel cell vehicle according to the exemplary embodiment of the present invention and the method for controlling a voltage in a stop-mode of a fuel cell vehicle may include: detecting, by a controller, whether a fuel cell enters a stop-mode (S100); calculating, by the controller, a voltage command value of a bus terminal based on available charging power of a battery representing a level of power chargeable in a high voltage battery when the fuel cell enters the stop-mode (S200); operating, by the controller, a converter connected between the high voltage battery and the bus terminal to adjust the voltage of the bus terminal to be the voltage command value of the bus terminal (S300); and increasing, by the controller, power consumption of an electric field load of a vehicle when the voltage is adjusted and then the voltage of the fuel cell measured by a voltage sensor may be equal to or greater than a reference voltage preset in a memory (S400 and S500).

The present invention uses a method for correcting a voltage command value based on available charging power of a high voltage battery without determining a decreasing control inhibit condition of the voltage of the bus terminal in advance. When the voltage command value is adjusted or corrected, the available charging power of the high voltage battery may be reduced (e.g., failure of a battery, sudden increase of temperature, sudden decrease of temperature, excessive SOC) or when a regenerative braking amount is substantial, the voltage command of the bus terminal may be maintained to be greater than the reference voltage near a preset OCV and thus the voltage of the fuel cell may also be maintained to be high. In particular, a method for performing a voltage decreasing control of a fuel cell with an initial reference voltage without correcting the voltage command value of the voltage decreasing control of the bus terminal but increasing the number of operating high voltage auxiliaries, etc., may be applied to supplement the output of the fuel cell with the increased the number of operating auxiliaries, thereby performing the control to decrease the voltage of the fuel cell.

The increase of the number of operating auxiliaries may cause loss of fuel efficiency and therefore the increase of operating auxiliaries may be performed only when the high voltage of the fuel cell is maintained for a predetermined period of time (e.g., when a high voltage is likely to deteriorate). When the voltage of the fuel cell is equal to or less than a set voltage, a control to stop the increase in the number of auxiliaries, normally drive the auxiliaries, and maintain the voltage command value of the bus terminal may be performed. Particularly, the introduction of ram air may be prevented by shutting off or closing an air shut-off valve while operating a blower to prevent the voltage of the fuel cell from increasing again.

First, the controller may be configured to detect whether the fuel cell enters the stop-mode (S100). When the SOC of the battery is equal to or greater than a first reference or the requited torque of the vehicle is equal to or less than a second reference, the controller may be configured to recognize that the power generation of the fuel cell is unnecessary to operate the fuel cell to enter the stop-mode. Additionally, the controller may be configured to calculate the voltage command value of the bus terminal based on the available charging power of the battery representing a level of power chargeable in a high voltage battery when the fuel cell enters the stop-mode (S200). In other words, the voltage dropping control (e.g., voltage adjustment) may be performed based on only the chargeable level of the high voltage battery, as opposed to the regenerative braking amount or the SOC of the high voltage battery and therefore a direct and elaborate control may be performed.

Particularly, the available charging power of the battery may be derived from the data map stored in the memory of the controller. The data map may use whether the high voltage battery breaks down, the temperature of the high voltage battery, and the SOC of the high voltage battery as an input value and use the available charging power of the high voltage battery as an output value. These values may be calculated in real time based on an equation or sensor data and may be configured as a set of data values preset by experiment, analysis, or the like.

Further, in the calculation process, a difference between the available charging power of the high voltage battery and the actual charging power may be reflected in the voltage of the bus terminal to calculate the voltage command value of the bus terminal. In particular, the voltage command value of the bus terminal may be calculated based on the following Equation 1.

$$\text{Voltage command value of bus terminal} = \text{voltage of bus terminal} - K_1 \times (\text{Available charging power of battery} - \text{charging voltage of battery} \times \text{charging current of battery}) \quad \text{Equation 1}$$

The controller may further be configured to operate a converter connected between the high voltage battery and the bus terminal to adjust the voltage of the bus terminal to be the voltage command value of the bus terminal. In the voltage adjustment, the controller may be configured to calculate the targeted charging current of the high voltage battery based on the voltage command value of the bus terminal and operate the converter based on the targeted charging current to charge the high voltage battery to adjust the voltage of the bus terminal to be the voltage command value of the bus terminal.

Additionally, the controller may be configured to increase the power consumption of the electric field load of the vehicle when the voltage is adjusted (S500) and then the voltage of the fuel cell measured by the voltage sensor may be equal to or greater than the reference voltage preset in the memory (S400). In the power consumption increase, the converter may be operated by increasing the power consumption of the electric field load of the vehicle and changing the voltage command value of the bus terminal to the reference voltage preset in the memory.

The process will be described in more detail with reference to FIG. 3. As shown in FIG. 3, the voltage command may be corrected based on the available charging power of the battery as in the above Equation 1. In other words, the difference between the available charging power of the high voltage battery and the actual charging power reflected in the actual voltage of the bus terminal may be corrected. By the above calculation of Equation 1, when the actual charging power is greater than the available charging power, the voltage command may be greater than the current voltage of the bus terminal and when the actual charging power is less than the available charging power, the voltage command may be less than the current voltage of the bus terminal but the minimum value may be set to be the reference voltage and thus, the voltage command may decrease only to the reference voltage. In particular, the sudden change in the voltage command may be prevented by limiting the ascending and descending slopes of the voltage command value. When the voltage command value is set, the target charging current of the battery for following up (e.g., reaching) the voltage command may be calculated and the charging current of the battery may be generated by an insulated-gate bipolar transistor (IGBT) duty control of the converter using a current sensor feedback of the battery.

The method for setting the voltage command of the high voltage battery using the map based on characteristics of the battery does not sufficiently consider vehicle load characteristics and therefore even when the voltage of the fuel cell may decrease, the voltage decrease may not be made. As in the present invention, the method for correcting the voltage command in consideration of the actual voltage of the bus terminal, the actual charging and discharging power of the battery, and the available power map of the battery is a more accurate and efficient method for increasing a frequency of preventing the loss of fuel efficiency or the overcharging of the battery and decreasing of the voltage of the fuel cell to improve the durability of the fuel cell.

Moreover, according to another exemplary embodiment of the present invention, in the calculation process, the controller may be configured to calculate the voltage command value of the bus terminal gradually decreasing based on the slope preset in the memory and in the voltage adjustment, the controller may be configured to calculate the target charging current of the high voltage battery based on the voltage command value of the bus terminal, operate the converter based on the target charging current, and limit the target charging current to the maximum value of the charging limit current of the battery based on the available charging power of the battery. Further, the charging limit current of the battery may be calculated by dividing the available charging power of the battery by the charging voltage of the battery.

This is illustrated in detail in FIG. 4. Referring to FIG. 4, instead of the method for correcting the voltage command value based on the available charging power of the battery, the method for setting the charging current limit value of the control of the converter is used. When the available charging power of the high voltage battery is reduced or the regenerative braking amount is substantial, the voltage command value may be fixed to the reference voltage and the charging current limit of the converter may be set, in which the actual voltage (equal to the voltage of the fuel cell) may be maintained to be greater than the set voltage command (reference voltage) of the bus terminal. When the voltage (voltage of the fuel cell) of the bus terminal is maintained to be greater than the reference voltage, the method for increasing the number of high voltage auxiliaries to decrease the voltage of the fuel cell to the reference voltage or less is as described above.

Particularly, the voltage command value may be generated as the final reference voltage by decreasing the voltage command with a constant slope without correcting the voltage command value and the command of the charging current limit value may also be generated using the data map. The charging limit current of the battery may be calculated by dividing the available charging power of the battery by the charging voltage of the battery as illustrated in FIG. 4. Using the final voltage command value and the charging limit current command, the current control for following up the targeted current may be performed.

In addition, the control to limit the actual charging/discharging current of the battery based on the charging current limit command may be performed. Unlike the method described above, the method for controlling the current limit may correct the voltage command value. In other words, the actual voltage of the bus terminal may be automatically increased to be greater than the reference voltage by limiting the charging and discharging current of the battery based on the state of the high voltage battery or the load state of the vehicle when the output of the fuel cell may not be generated even though the voltage decreasing command of the bus terminal is set to be the reference voltage.

Moreover, the control of the voltage of the bus terminal using the converter may calculate the target charging current for following up the set voltage command of the bus terminal and the controller may use the method for controlling a converter IGBT duty by being fed back with an actual current sensor value I for generating the target charging current. The information regarding the available charging power of the battery based on the temperature or the SOC may be stored in the memory of the controller and may be calculated in real time based on the temperature or the SOC. A voltage sensor configured to measure the actual voltage of the bus terminal and a voltage sensor configured to measure the voltage of the battery may also be included in a circuit.

As a representative example of the high voltage electric field load, there may be the auxiliary of the fuel cell. The auxiliary may be an air blower, a water pump, a hydrogen recirculation blower, etc. The operation state of the fuel cell system due to the increase in the output of the high voltage auxiliary should not be changed. For example, the revolutions per minute (RPM) of the air blower may be increased while the introduction and discharge of air into and from the fuel cell system is prevented or the RPM of the water pump may be increased while fuel cell system is prevented from being cooled. Accordingly, when an air, cooling water, or hydrogen bypass valve of the stack is provided, the driving of the auxiliary may be increased while the introduction of air, hydrogen, or cooling water into the stack may be prevented.

A stack bypass valve is a valve configured to selectively introduce the cooling water into the stack or the load apparatus and the method for operating the stack bypass valve to prevent the cooling water from being introduced into the stack and increase the RPM of the cooling pump may be used. This may be applied in a similar manner to the air blower or the hydrogen recirculation blower. Accordingly, the bypass valve may be disposed in an air supply system or a hydrogen recirculation system.

Further, a method for operating the high voltage auxiliaries in a direction to increase a heat loss of the high voltage auxiliaries by the low efficiency operation of the high voltage auxiliaries to increase the consumption output of the auxiliaries in the state in which air/hydrogen/cooling water is not supplied may also be used. In addition to the high voltage auxiliary for driving the fuel cell system, the consumption of the high voltage auxiliaries (e.g., air compressor or heating heater associated with air conditioning in the vehicle, low voltage power converter for charging a low voltage 12V battery) requited in the vehicle may be increased. The increase of the target charging voltage of the low voltage power converter for charging the low voltage battery to about 14 to 15V greater than 12V may be one example.

In the voltage control method as described above, the output of the fuel cell generated by the voltage decreasing control of the bus terminal may be consumed as the driving output of the vehicle when the driving output of the vehicle is generated in the stop mode entry state of the fuel cell to remove the voltage of the fuel cell and terminal in the state in which there is no driving output of the vehicle, the output of the fuel cell generated by the voltage decreasing control of the bus may be consumed for the charging of the battery to remove the voltage of the fuel cell.

Further, when the regenerative braking amount is substantial when the fuel cell enters the stop-mode, the output of the fuel cell generated by the voltage decreasing control of the bus terminal may be supplemented by the control to additionally increase the auxiliaries, thereby decreasing the voltage of the fuel cell.

The method for performing the voltage decreasing control of the bus terminal after the power generation of the fuel cell stops is more advantageous in the fuel efficiency since the output of the fuel cell is temporarily generated, compared to the method for limiting the voltage upper value of the bus terminal to prevent the voltage of the fuel cell from increasing to the high voltage area in the state in which the power generation of the fuel cell is maintained. To decrease the voltage of the bus terminal when the power generation is maintained, the output of the fuel cell may be continuously generated and thus the battery may be excessively charged, thus causing the loss of fuel efficiency. Further, after the power generation stops, the fuel cell may be naturally discharged due to a hydrogen cross over to decrease of the voltage and the hydrogen discarded due to the hydrogen cross over generates the output of the fuel cell by the voltage decreasing control of the bus terminal, and thus the output charges the battery or may be consumed by the vehicle auxiliaries, thereby improving the fuel efficiency.

According to the method for controlling a voltage of a fuel cell in a stop-mode of a fuel cell vehicle of the present invention, it may be possible to secure the durability of the fuel cell and prevent the fuel efficiency from reducing, by actively decreasing the voltage when the fuel cell of the fuel cell vehicle stops. Further, it may be possible to sufficiently protect the durability of the fuel cell by more rapidly and certainly decreasing the voltage of the fuel cell while preventing the reduction in the fuel efficiency and the overcharging of the high voltage battery.

Although the present invention has been shown and described with respect to exemplary embodiments, it will be obvious to those skilled in the art that the present invention may be variously modified and altered without departing from the spirit and scope of the present invention as defined by the following claims.

What is claimed is:

1. A method for controlling a voltage in a stop-mode of a fuel cell vehicle, comprising:
   detecting, by a controller, whether a fuel cell enters the stop-mode;
   calculating, by the controller, a voltage command value of a bus terminal based on available charging power of a battery representing a level of power chargeable in a high voltage battery when the fuel cell enters the stop-mode;
   operating, by the controller, a converter connected between the high voltage battery and the bus terminal to adjust the voltage of the bus terminal to be the voltage command value of the bus terminal; and
   increasing, by the controller, power consumption of an electric field load of a vehicle when the voltage is adjusted and then the voltage of the fuel cell measured by a voltage sensor is equal to or greater than a reference voltage preset in a memory,
   wherein a difference between the available charging power of the high voltage battery and actual charging power is reflected in the voltage of the bus terminal to calculate the voltage command value of the bus terminal, and
   wherein the voltage command value of the bus terminal is calculated based on the following Equation:

Voltage command value of bus terminal=voltage of bus terminal—K1×(Available charging power of battery−charging voltage of battery×charging current of battery, wherein K1means a slope preset in the memory of the controller.

2. The method of claim 1, wherein when a state of charge (SOC) of the battery is equal to or greater than a first reference or a required torque of the vehicle is equal to or less than a second reference, the controller is configured to operate the fuel cell enter the stop-mode.

3. The method of claim 1, wherein the available charging power of the battery is derived using a data map stored in the memory of the controller.

4. The method of claim 3, wherein the data map uses whether the high voltage battery breaks down, temperature of the high voltage battery, and the SOC of the high voltage battery as an input value and uses the available charging power of the high voltage battery as an output value.

5. The method of claim 1, wherein in the voltage adjustment, the controller is configured to calculate a target charging current of the high voltage battery based on the voltage command value of the bus terminal and operate the converter based on the target charging current to charge the high voltage battery to adjust the voltage of the bus terminal to be the voltage command value of the bus terminal.

6. The method of claim 1, wherein the converter is operated by changing the voltage command value of the bus terminal to the reference voltage preset in a memory of the controller while increasing the power consumption of the electric field load of the vehicle.

7. A method for controlling a voltage in a stop-mode of a fuel cell vehicle, comprising:
   detecting, by a controller, whether a fuel cell enters the stop-mode;
   calculating, by the controller, a voltage command value of a bus terminal based on available charging power of a battery representing a level of power chargeable in a high voltage battery when the fuel cell enters the stop-mode;

operating, by the controller, a converter connected between the high voltage battery and the bus terminal to adjust the voltage of the bus terminal to be the voltage command value of the bus terminal; and increasing, by the controller, power consumption of an electric field load of a vehicle when the voltage is adjusted and then the voltage of the fuel cell measured by a voltage sensor is equal to or greater than a reference voltage preset in a memory;

calculating, by the controller, the voltage command value of the bus terminal gradually descending based on a slope preset in the memory of the controller;

calculating, by the controller, a target charging current of the high voltage battery based on the voltage command value of the bus terminal;

operating, by the controller, the converter based on the targeted charging current; and limiting, by the controller, the target charging current to a maximum value of a battery charging limit current based on the available charging power of the battery to a maximum value.

8. The method of claim 7, wherein the battery charging limit current is calculated by dividing the available charging power of the battery by a charging voltage of the battery.

9. The method of claim 1, wherein the power consumption of the electric field load of the vehicle is increased based on a driving increase and a low efficiency operation of high voltage auxiliaries including an air blower, a hydrogen recirculation blower, or a cooling water pump.

10. A system for controlling a voltage in a stop-mode of a fuel cell vehicle, comprising:

a memory configured to store program instructions; and a processor configured to execute the program instructions, the program instructions when executed configured to:

detect whether a fuel cell enters the stop-mode;

calculate a voltage command value of a bus terminal based on available charging power of a battery representing a level of power chargeable in a high voltage battery when the fuel cell enters the stop-mode;

operate a converter connected between the high voltage battery and the bus terminal to adjust the voltage of the bus terminal to be the voltage command value of the bus terminal; and increase power consumption of an electric field load of a vehicle when the voltage is adjusted and then the voltage of the fuel cell measured by a voltage sensor is equal to or greater than a reference voltage preset in a memory, wherein a difference between the available charging power of the high voltage battery and actual charging power is reflected in the voltage of the bus terminal to calculate the voltage command value of the bus terminal, and wherein the voltage command value of the bus terminal is calculated based on the following Equation:

Voltage command value of bus terminal=voltage of the bus terminal—K1×(Available charging power of batter−charging voltage of battery× charging current of battery), wherein K1means a slope preset in the memory of the controller.

11. The system of claim 10, wherein when a state of charge (SOC) of the battery is equal to or greater than a first reference or a required torque of the vehicle is equal to or less than a second reference, the program instructions when executed are further configured to operate the fuel cell enter the stop-mode.

12. The system of claim 11, wherein the available charging power of the battery is derived using a data map stored in the memory.

13. The system of claim 12, wherein the data map uses whether the high voltage battery breaks down, temperature of the high voltage battery, and the SOC of the high voltage battery as an input value and uses the available charging power of the high voltage battery as an output value.

14. The system of claim 10, wherein the program instructions when executed are further configured to calculate a target charging current of the high voltage battery based on the voltage command value of the bus terminal and operate the converter based on the target charging current to charge the high voltage battery to adjust the voltage of the bus terminal to be the voltage command value of the bus terminal.

15. The system of claim 10, wherein the converter is operated by changing the voltage command value of the bus terminal to the reference voltage preset in a memory of the controller while increasing the power consumption of the electric field load of the vehicle.

16. A system for controlling a voltage in a stop-mode of a fuel cell vehicle, comprising:

a memory configured to stop program instruction; and a processor configured to execute the program instructions, the program instruction when executed configured to:

detect whether a fuel cell enters the stop-mode;

calculate a voltage command value of a bus terminal based on available charging power of a battery representing a level of power chargeable in a high voltage battery when the fuel cell enters the stop-mode;

operate a converter connected between the high voltage battery and the bus terminal to adjust the voltage of the bus terminal to be the voltage command value of the bus terminal; and increase power consumption of an electric field load of a vehicle when the voltage is adjusted and then the voltage of the fuel cell measured by a voltage senor is equal to or greater than a reference voltage preset in a memory, wherein the program instructions when executed are further configured to:

calculate the voltage command value of the bus terminal gradually descending based on a slope preset in the memory of the controller;

calculate a target charging current of the high voltage battery based on the voltage command value of the bus terminal;

operate the converter based on the targeted charging current; and limit the target charging current to a maximum value of a battery charging limit current based on the available charging power of the battery to a maximum value.

* * * * *